W. W. BLAIR.
VEHICLE SPRING.
APPLICATION FILED FEB. 29, 1908.
915,264.
Patented Mar. 16, 1909.
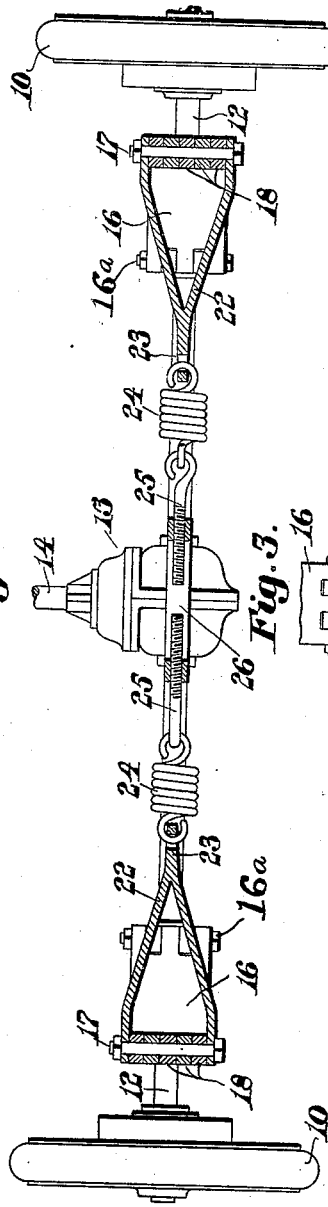
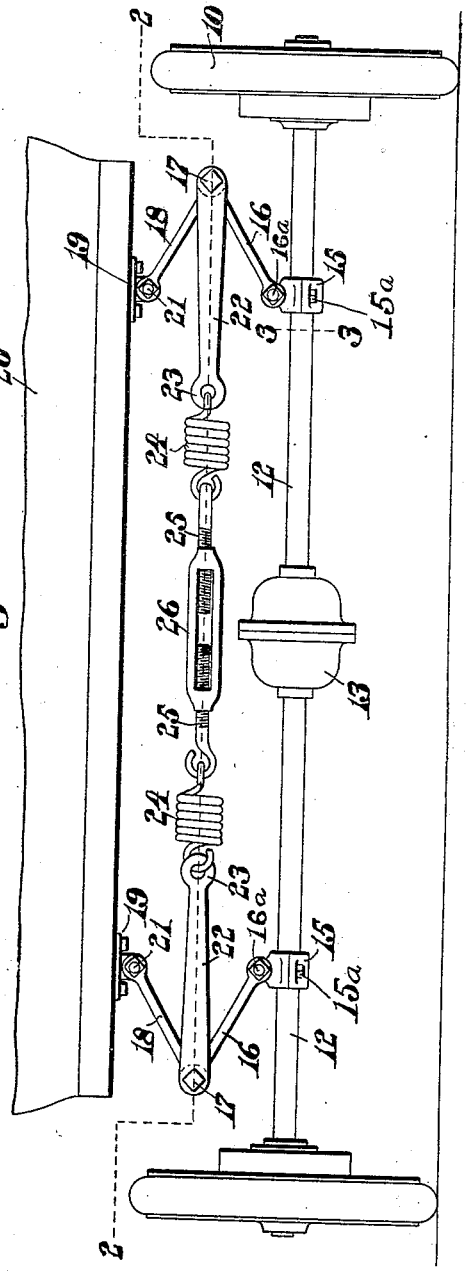
Witnesses:
Howard Hanscom
Nathan E. Lombard
Inventor:
Wesley W. Blair,
by Walter E. Lombard,
Atty.

UNITED STATES PATENT OFFICE.

WESLEY W. BLAIR, OF NEWTONVILLE, MASSACHUSETTS.

VEHICLE-SPRING.

No. 915,264.  Specification of Letters Patent.  Patented March 16, 1909.

Application filed February 29, 1908. Serial No. 418,869.

*To all whom it may concern:*

Be it known that I, WESLEY W. BLAIR, a citizen of the United States of America, and a resident of Newtonville, in the county of Middlesex and State of Massachusetts, have invented certain new and useful Improvements in Vehicle-Springs, of which the following is a specification.

This invention relates to spring-supporting mechanisms for the bodies of motor cars or other vehicles and has for its object the production of such a device by which the body of the vehicle may be secured directly to the axle or frame by pivoted members connected together by yielding devices, the tension of which may be regulated as desired.

The invention consists in certain novel features of construction and arrangement of parts which will be readily understood by reference to the description of the drawings and to the claims hereinafter given.

Of the drawings: Figure 1 represents a rear view of a portion of a motor vehicle showing the rear axle and the means for supporting the body of the vehicle thereon. Fig. 2 represents a horizontal section of the same, the cutting plane being on line 2—2 on Fig. 1, and Fig. 3 represents a section through the axle showing the means of securing thereto the fixed member to which the supporting mechanism is attached.

Similar characters designate like parts throughout the several figures of the drawings.

In the drawings, 10 represents the rear wheels of a motor vehicle mounted in any well-known manner on the axle 11, revoluble in the tubular members 12, said axle 11 being driven by any suitable driving mechanism within the casing 13 from which extends the usual driving shaft 14. To the tubular members 12 at each side of the casing 13 is securely clamped the fixed support 15 to which is pivoted a member 16, the free end of which is pivoted by means of the bolt 17 to a similar member 18, the opposite end of which is pivoted to the lug 19 secured to the under side of the body 20 of the vehicle by means of a suitable bolt 21. The support 15 is in the form of a collar, secured at any point upon the tubular member 12 by means of the bolt 15$^a$, and to which the member 16 is pivoted by the bolt 16$^a$. The pivoted bolt 17 also extends through the two arms of a bifurcated member 22 the outer or free end of which is provided with an eye 23 to which is secured a yielding member such as the coiled spring 24, the opposite end of which is secured to a threaded member 25, the threaded end of which is threaded to a turnbuckle 26 connecting the two members 25 and making a yieldable connection between the two pivots 17 of the pair of pivoted members 16 and 18.

The tension of the coiled springs 24 is such as to normally retain the pivots 17 at such distance from each other as to keep the body 20 elevated at a suitable distance from the tubular members 12. It is self-evident, however, that under abnormal conditions, when weight is added to the body 20 or the car is subjected to a jolt, the members 16 and 18 will move about the pivot 17 so as to lessen the distance between the under side of the body 20 and the tubular members 12, the springs 24 yielding to permit this action. This will cause a greater separation of the two pivots 17 which pivots will be returned to their normal positions as soon as the abnormal strain has ceased by means of the springs 24. As the ends of the members 25 are provided with right and left hand threads which are threaded to the turnbuckle 26, it is obvious that by moving the turnbuckle 26 in either direction, the distance between the two pivots 17 may be increased or decreased, as desired.

While in the drawings a single set of connecting devices are indicated between the bifurcated members 22, it is obvious that if so desired these members may be duplicated.

While the construction shown in the drawings is a most convenient one to accomplish the object sought it is quite obvious that the details of construction of these parts may be varied without altering the principles of the invention, which consist primarily in providing two pairs of members, the members of each pair of which are pivotally secured to fixed points upon the axle and body of a carriage while their pivotal connections are connected together by a yieldable connector which includes mechanism for varying the distance between these pivots to regulate the resiliency of the spring-supporting mechanism interposed between the axle and the body of the carriage. This construction provides a very simple means of supporting the body of a vehicle upon its axle while at the same time the supporting mechanism is so connected together by yieldable means which will resist any sudden jolt but permit the supporting means to yield when any abnormal weight is added to the body.

It is believed that from the foregoing the operation of the invention and its many advantages will be fully apparent without any further description.

Having thus described my invention, I claim:

1. The combination with a carriage axle and a carriage body, of two pairs of members pivoted together and pivotally connected at their upper ends with said body and at their lower ends with an adjustable collar encircling said axle, the pivotal point between said members normally alining with the outer edge of said body and a resilient means connecting the pivotal points of each pair of members.

2. The combination with a carriage axle and a carriage body, of two pairs of members pivoted together and pivotally connected at their upper ends with said body and at their lower ends with a sliding collar positioned upon said axle and a means connecting the pivot points of said pairs of members.

Signed by me at 7 Water St., Boston, Mass., this 29th day of January, 1908.

WESLEY W. BLAIR.

Witnesses:
 WALTER E. LOMBARD,
 EDNA C. CLEVELAND.